United States Patent
Lelong (10) Patent No.: US 7,017,257 B2
(45) Date of Patent: Mar. 28, 2006

(54) METHOD FOR DIRECTLY DEBONDING SLIDERS DURING SINGLE SLIDER PROCESSING

(75) Inventor: Xavier Charles Lelong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 353 days.

(21) Appl. No.: 10/462,362

(22) Filed: Jun. 16, 2003

(65) Prior Publication Data

US 2004/0250414 A1 Dec. 16, 2004

(51) Int. Cl.
*G11B 5/127* (2006.01)
*H04R 31/00* (2006.01)

(52) U.S. Cl. .............. 29/603.18; 29/603.12; 29/603.15; 29/603.16; 29/417; 216/22; 216/39; 216/41; 260/235.7; 260/235.8; 260/236.5; 260/236.6; 260/237; 451/5; 451/41

(58) Field of Classification Search .......... 29/417, 29/603.07, 603.12, 603.15, 603.16, 603.18; 216/22, 39, 41, 47; 360/235.7, 235.8, 236.5, 360/238.6, 237; 451/5, 41
See application file for complete search history.

(56) References Cited

U.S. PATENT DOCUMENTS 5,468,177 A * 11/1995 Kindler et al. ............ 451/364
6,129,855 A * 10/2000 Sawada et al. ............. 216/22
6,287,475 B1 * 9/2001 Fukushima et al. ........ 216/22
6,806,725 B1 * 10/2004 Tsui et al. ................ 324/755

FOREIGN PATENT DOCUMENTS

JP        2000285429 A  * 10/2000

OTHER PUBLICATIONS

"A silicon microactuator using integrated microfabrication technology"; Lu, Y.; Yang, J.P.; Chen, J.; Chen, S.X.; Magnetics, IEEE Transactions on vol. 39; Sep. 2003, pp.: 2240-2242.*

* cited by examiner

*Primary Examiner*—A. Dexter Tugbang
*Assistant Examiner*—Paul D. Kim
(74) *Attorney, Agent, or Firm*—Bracewell & Giuliani LLP (57) ABSTRACT

A process for directly debonding sliders during single slider processing includes placing the sliders in pockets in a divider with one surface of each slider contacting a tape. A planerization material encapsulates the portions of the sliders which are not in contact with the tape. The planerization material is cured and the assembly is bonded to a process carrier. After ABS are etched into the sliders, the sliders are debonded by heating, cleaned, and inspected. The divider is removed from the carrier with the sliders still attached to the divider by the planerization material. The divider is then sandwiched between two lids to form a shim stack to enhance removal of the planerization material. The planerization material is removed in a hot solvent ultra-sonic bath and the lids are then removed for additional cleaning and inspection of the sliders.

8 Claims, 6 Drawing Sheets

METHOD FOR DIRECTLY DEBONDING SLIDERS DURING SINGLE SLIDER PROCESSING

BACKGROUND OF THE INVENTION

1. Technical Field

The present invention relates in general to an improved method and apparatus for processing sliders and, in particular, to an improved method and apparatus for directly debonding sliders during single slider processing.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Historically, the sliders (and their magnetic heads) used in computer hard drives have been processed by depositing thin films onto ceramic wafers which are then cut into strips which are called "rows." These rows are then lapped to specified dimensional tolerances after which a pattern, e.g., an "air bearing surface" or ABS, is etched into the top surface of the rows that will allow the slider to fly above the disk at a specific fly height. At the end of manufacturing, these rows are cut into individual sliders which are attached to suspensions and built into the hard disk drives.

Flying the sliders of hard disk drives closer to the magnetic disks increases aerial density, which increases the capacity of the hard disk drives. In order to fly closer to the disks, the dimensional tolerances to which sliders are lapped are getting tighter as the technology evolves. It is this tightening of lapping tolerances that has forced the industry into lapping the individual sliders instead of lapping entire rows of unseparated sliders. This lapping of individual sliders is also known as "single slider processing."

One significant challenge in single slider processing is the bonding of the individual sliders onto a process carrier (for ABS etching), and the subsequent steps of debonding, cleaning, and inspection, which were historically done at the row level. Since the equipment used for the ABS etching is expensive, the goal has been to bond the individual sliders in a tightly spaced array to maximize the batch processes involved with the etching. This means that hundreds of these sliders are bonded to a carrier, etched, and then debonded, cleaned and shipped.

Since the etching process is a photolithography process which involves spin-on resists, the surfaces of the carriers of the sliders must be extremely planer in order to evenly distribute the resist substances. For this reason, the gaps between the individual sliders are filled with a planerization material which makes the entire surface of the carrier planer. However, one of the more serious problems encountered was how to debond the sliders from their carrier without damaging the sliders, and then present them for cleaning, inspection, and shipping. Thus, an improved method and/or apparatus for directly debonding the individual sliders during single slider processing which reduces the incidence of slider damage would be very desirable.

SUMMARY OF THE INVENTION

One embodiment of a system, method, and apparatus for directly debonding sliders during single slider processing is disclosed. The first step in the direct debond process occurs before the sliders are bonded to the carrier. A thin sheet of stainless steel with laser cut or chemically etched rectangular holes or pockets is placed onto a process tape. This stainless steel sheet is called a divider. The individual sliders are placed into the pockets with the surfaces of the sliders to be etched facing down onto the process tape.

A planerization material is introduced between the sliders and is allowed to fully encapsulate all five surfaces of the sliders which are not in contact with the tape. The planerization material is cured and the assembly (divider+sliders+planerization material) is flipped and bonded to the process carrier using a thermal release adhesive. After the air bearing patterns have been etched into the sliders, the next step is to "debond" the entire array of the sliders and present them for final cleaning and inspection operations. The divider and carrier are heated to activate the thermal release bonding adhesive and the divider is removed from the carrier. The sliders are still attached to the divider by the planerization material which is not affected by heat. The divider is then sandwiched between two more stainless steel sheets of laser cut stainless steel, which are called lids. This sandwich is called a "shim stack."

The shim stack lids only contact the four corners of the sliders, which maximizes the fluid flow required for cleaning away the planerization material. The shim stack is placed into a hot solvent ultra-sonic bath which dissolves the planerization material and cleans the sliders. A vacuum fixture is used when either the top or bottom of the shim stack is removed. The vacuum fixture uses pedestals which protrude through the lid to contact the sliders and hold them with a vacuum. This allows access to both the top and the bottom of the sliders for additional cleaning and inspections.

The direct debond process of the present invention has many advantages. The divider acts as a stabilizer during the planerization process that reduces contraction of the planerization material during curing and thereby reduces movement of the sliders by the planerization material. The introduction of the metal webbing between the sliders acts as a stabilizer much like rebar in concrete. This additional support eliminates the position variations introduced by curing the planerization material. There is also a decreased yield loss associated with handling. Prior art processes used robotic pick and place tools to transfer the sliders from the process carrier to a cleaning and inspection tray. This transfer caused mechanical damage which translated to yield loss. The present invention also reduces capital investment by eliminating the need for the expensive pick and place robots that used to transfer sliders from the process carrier to the cleaning and inspection trays.

In addition, data integrity is maintained throughout the process as performance and defect data is collected and associated with each individual slider during processing. The collected data is associated with a position on the carrier. In the prior art, any time a slider was transferred from one carrier to another, the serial number had to be read to ensure that the data followed the slider to the new carrier. In contrast, the direct debond process of the present invention ensures that the sliders always stay with the divider, thus the transferring operations are eliminated and data integrity is maintained through out the process. The elimination of transferring operations also reduces the risk of mishaps such as mixing or spilling of parts.

The present invention also has superior cleaning and inspection capabilities. The cleaning trays used in the industry have traditionally been injection molded plastic trays in which the parts sit in pockets. The three-piece shim stack of the present invention was designed to maximize fluid flow around the sliders, which result in cleaner parts and higher yield. Furthermore, the shim stack allows access to all sides of the sliders since the top and bottom of the stack can be removed without disturbing the sliders. A vacuum fixture holds the parts extremely flat so that inspections stations do not have problems with focus issues. Consequently, inspection cycle times are shorter and fewer inspection stations are needed.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
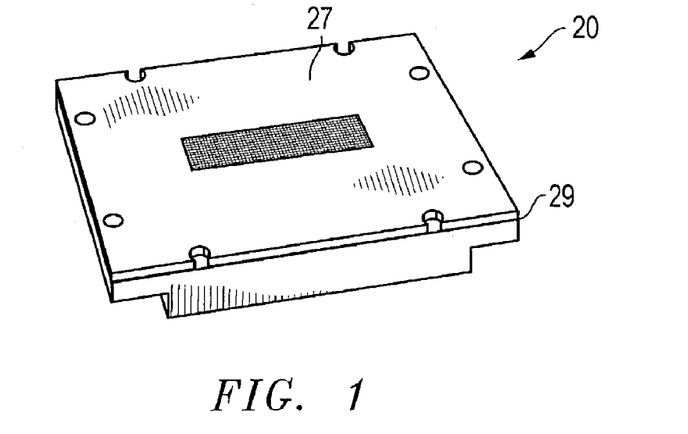
FIG. 1 is an isometric view of one embodiment of a process carrier assembly constructed in accordance with the present invention.
Figure 2:
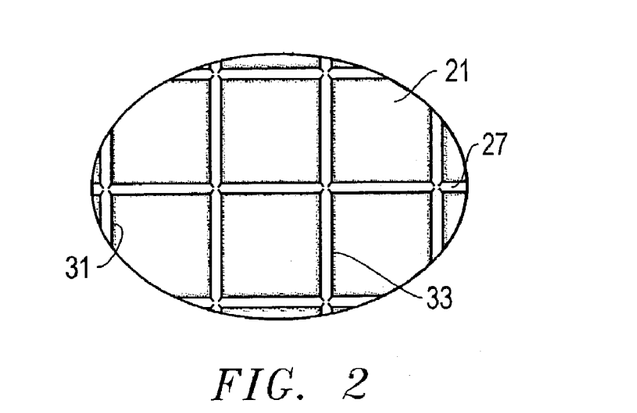
FIG. 2 is an enlarged plan view of an upper surface of the process carrier assembly of FIG. 1.
Figure 5:
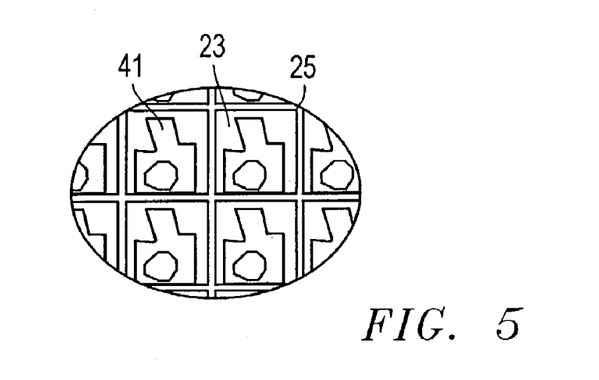
FIG. 5 is an enlarged plan view of sliders in the divider.

Referring to FIGS. 1–17, a system, method, and apparatus for processing sliders during single slider processing is disclosed in accordance with the present invention. The primary tool utilized by the present invention for processing the sliders is a process carrier assembly 20 (FIG. 1). Each of the sliders 21 (FIG. 2) is generally rectangular with six surfaces, including an etch surface 23 (FIG. 5) and four corners 25. However, the present invention is readily adaptable to components other than sliders having various different sizes and shapes.

Figure 3:
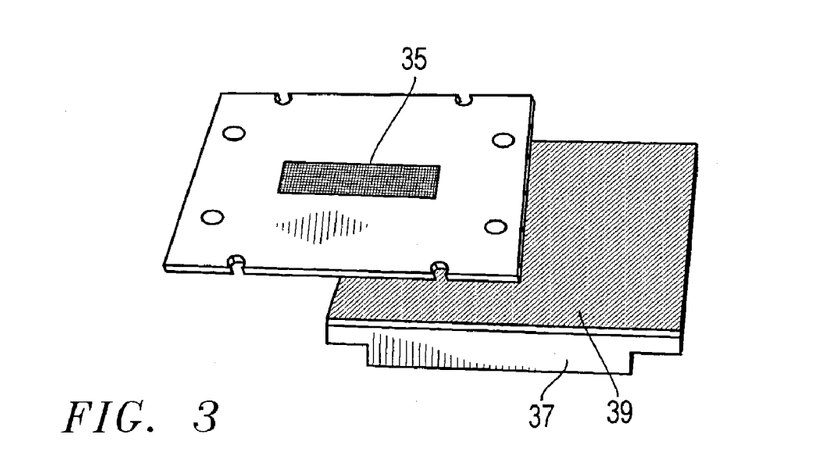
FIG. 3 is an isometric view of thermal debonding of a divider from the process carrier assembly of FIG. 1.
Figure 4:
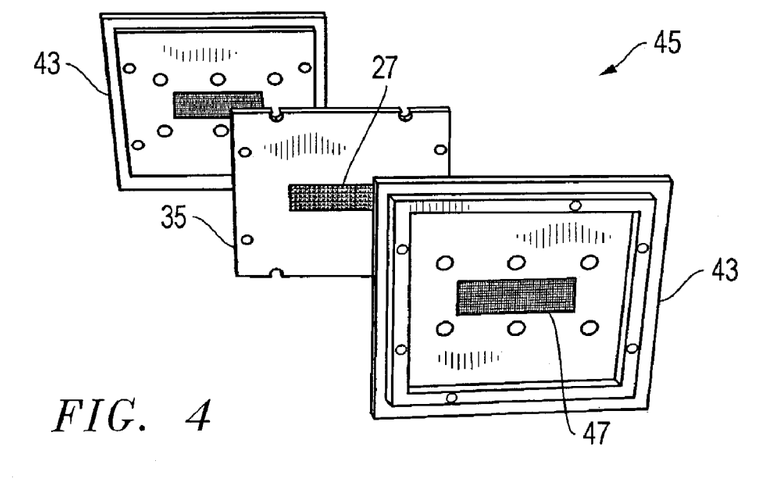
FIG. 4 is an exploded isometric view of a shim stack constructed in accordance with the present invention.
Figure 17:
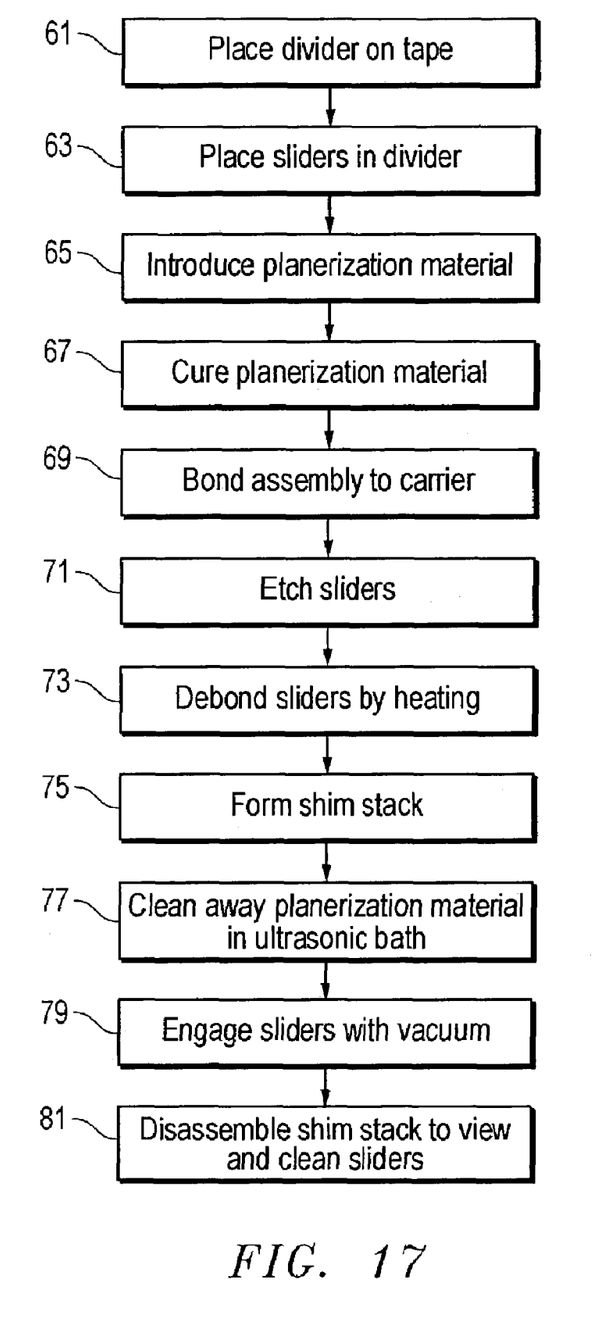
FIG. 17 is a flow chart of the steps of one embodiment of the present invention.

Initially, a divider 27 (FIGS. 1 and 2) is placed on a tape 29 or process tape, as depicted at 61 in FIG. 17. In the embodiment shown, the divider 27 is formed from a thin sheet of stainless steel with laser cut or chemically etched rectangular holes or pockets 31. One slider 21 is placed in each of the pockets 31 in the divider 27, such that the etch surface 23 of each slider 21 faces down onto and is retained by the tape 29, as illustrated at 63 in FIG. 17. The tape 29 is adhesive and provides a low level of retention for the sliders 21 relative to the divider 27. To further stabilize the sliders 21 during subsequent processing steps, a liquid planerization material 33 (FIG. 2) is introduced between the sliders 21 and the divider 27, as depicted at 65 in FIG. 17. The planerization material 33 fully encapsulates all five surfaces of the sliders 21 other than the etch surfaces 23, which are in contact with the tape 29. The planerization material 33 is cured, as illustrated at 67 in FIG. 17, such that the divider 27, the sliders 21, and the planerization material 33 form an assembly 35 (FIG. 3). In this way, the sliders 21 are substantially immobilized relative to the divider 27.

In the next step, the assembly 35 is joined to a carrier 37 (FIG. 3) by flipping the cured assembly 35 over, and bonding the assembly 35 to the carrier 37 using, in one embodiment, a thermal release adhesive 39, as depicted at 69 in FIG. 17. The air bearing patterns 41 (FIG. 5) are etched into the etch surfaces 23 of the sliders 21, as illustrated at 71 in FIG. 17. The next step is to "debond" the entire array of sliders 21 to present them for final cleaning and inspection. The assembly 35 is removed from carrier 37 and the sliders 21 are debonded by heating the assembly 35 and the carrier 37 to activate the thermal release adhesive 39, as depicted at 73 in FIG. 17. The assembly 35 is thereby removed from the carrier 37, such that the sliders 21 are still attached to the divider 27 by the planerization material 33 which is not affected by the heat.

Figure 6:
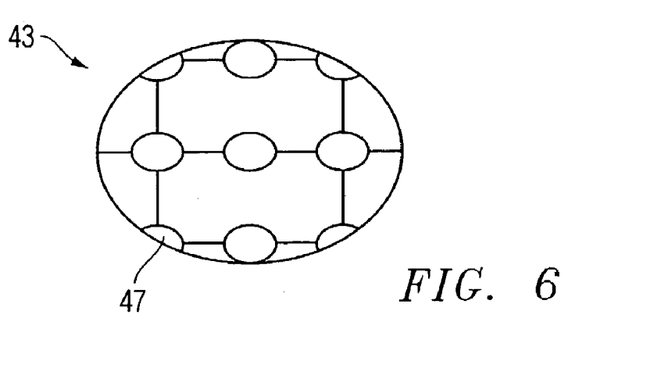
FIG. 6 is an enlarged plan view of a lid for the shim stack of FIG. 4.
Figure 7:
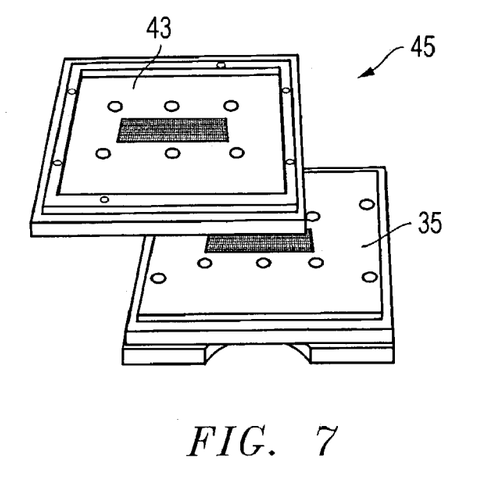
FIG. 7 is an isometric view of the shim stack of FIG. 4 at an initial phase of assembly.
Figure 8:
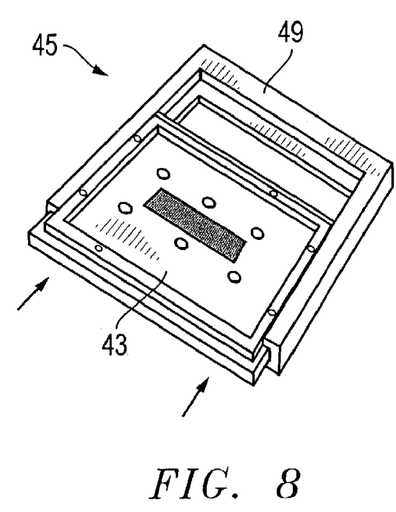
FIG. 8 is an isometric view of the shim stack of FIG. 4 during assembly of a clip thereto.
Figure 9:
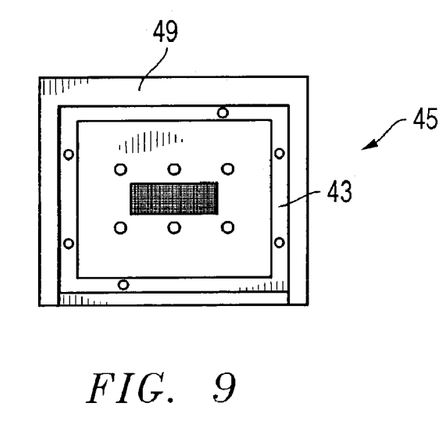
FIG. 9 is a top view of the assembled shim stack of FIG. 4.
Figure 10:
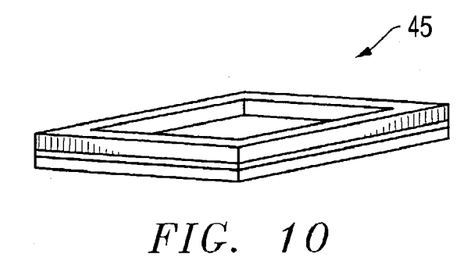
FIG. 10 is a side isometric view of the assembled shim stack of FIG. 4.

The assembly 35 is then mounted to a fixture (FIGS. 4 and 7–10) by sandwiching the divider 27 between two lids 43 (FIG. 7) to form a "shim stack" 45, as illustrated at 75 in FIG. 17. At least one clip 49 (FIG. 8) is used to secure the shim stack 45. In one embodiment, each lid 43 is a laser-cut, stainless steel sheet having a webbing 47 that is approximately 40 to 50 microns wide. After the shim stack 45 is formed, the sliders 21 are enabled to move again relative to the divider by flowing fluid through the shim stack 45 to clean away the planerization material 33. In the present embodiment, this step is done by placing the shim stack 45 in a hot solvent ultra-sonic bath, as depicted at 77 in FIG. 17, to dissolve the planerization material 33 and clean the sliders 21. The webbing 47 (FIG. 6) of the lids 43 only contact the four corners 25 (FIG. 5) of the sliders 21 to maximize the fluid flow to improve cleaning of the sliders 21.

Figures 11, 12, 13, 14:
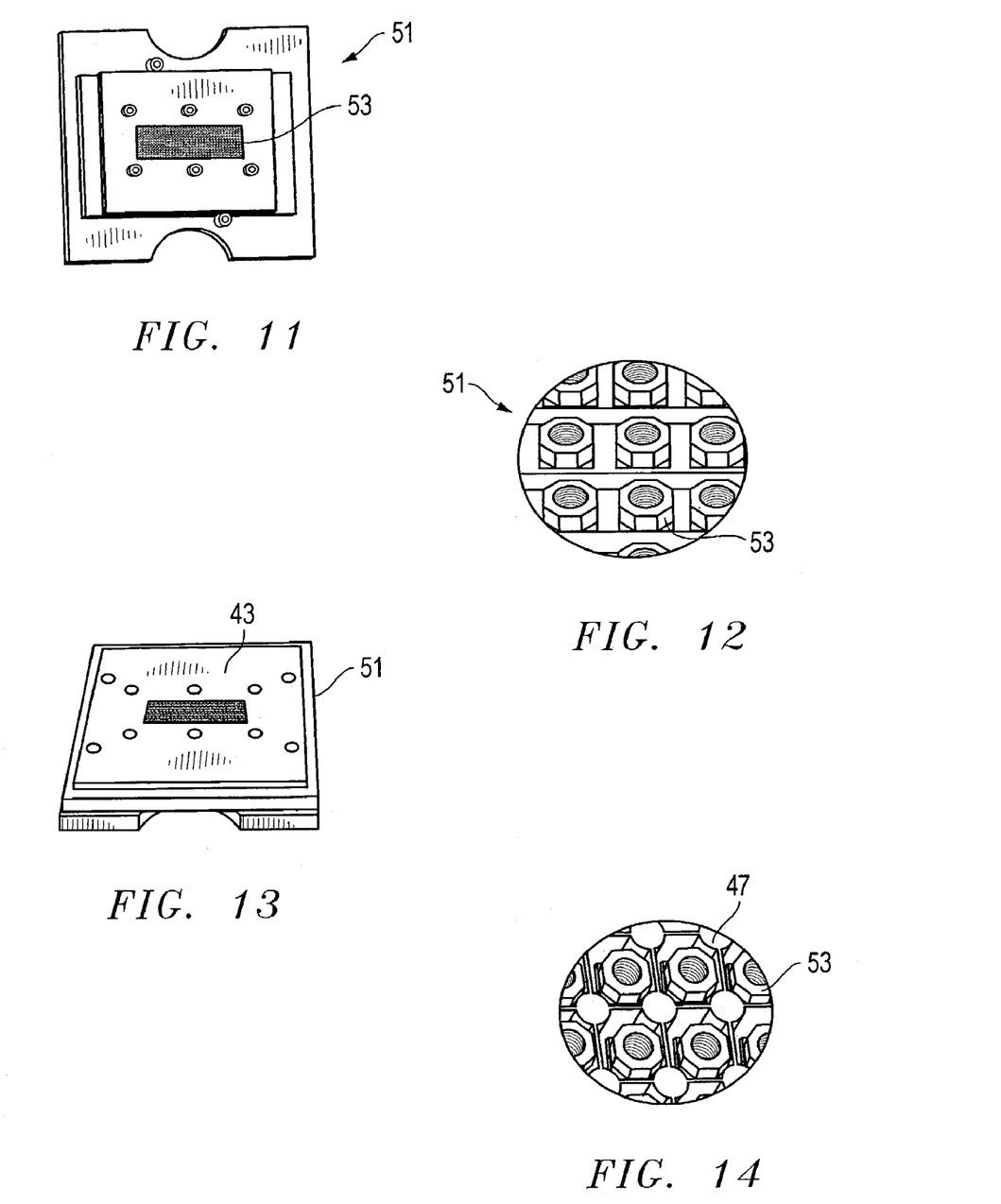
FIG. 11 is a plan view of a vacuum fixture constructed in accordance with the present invention.
FIG. 12 is an enlarged isometric view of an upper surface of the vacuum fixture of FIG. 11.
FIG. 13 is an isometric view showing interaction of the lid of FIG. 6 and the vacuum fixture of FIG. 11.
FIG. 14 is an enlarged isometric view showing interaction of the lid and the vacuum fixture.
Figure 15:
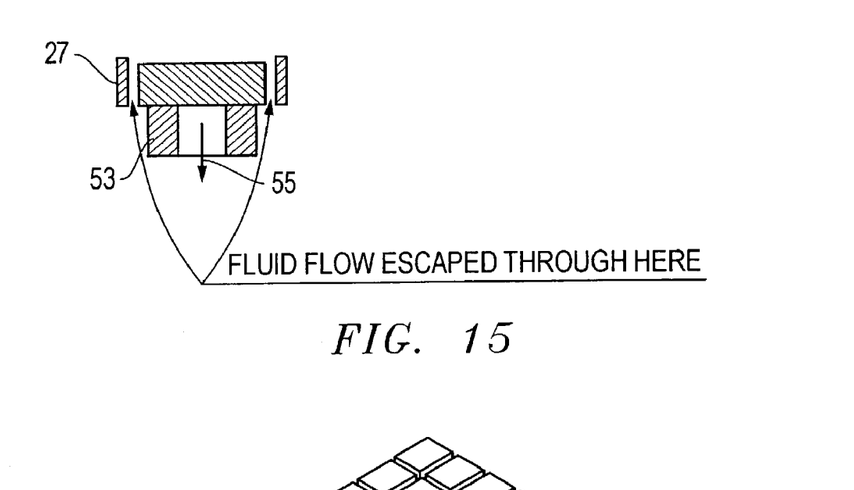
FIG. 15 is a sectional side view of a slider in a pocket of the divider on a pedestal of the vacuum fixture.
Figure 16:
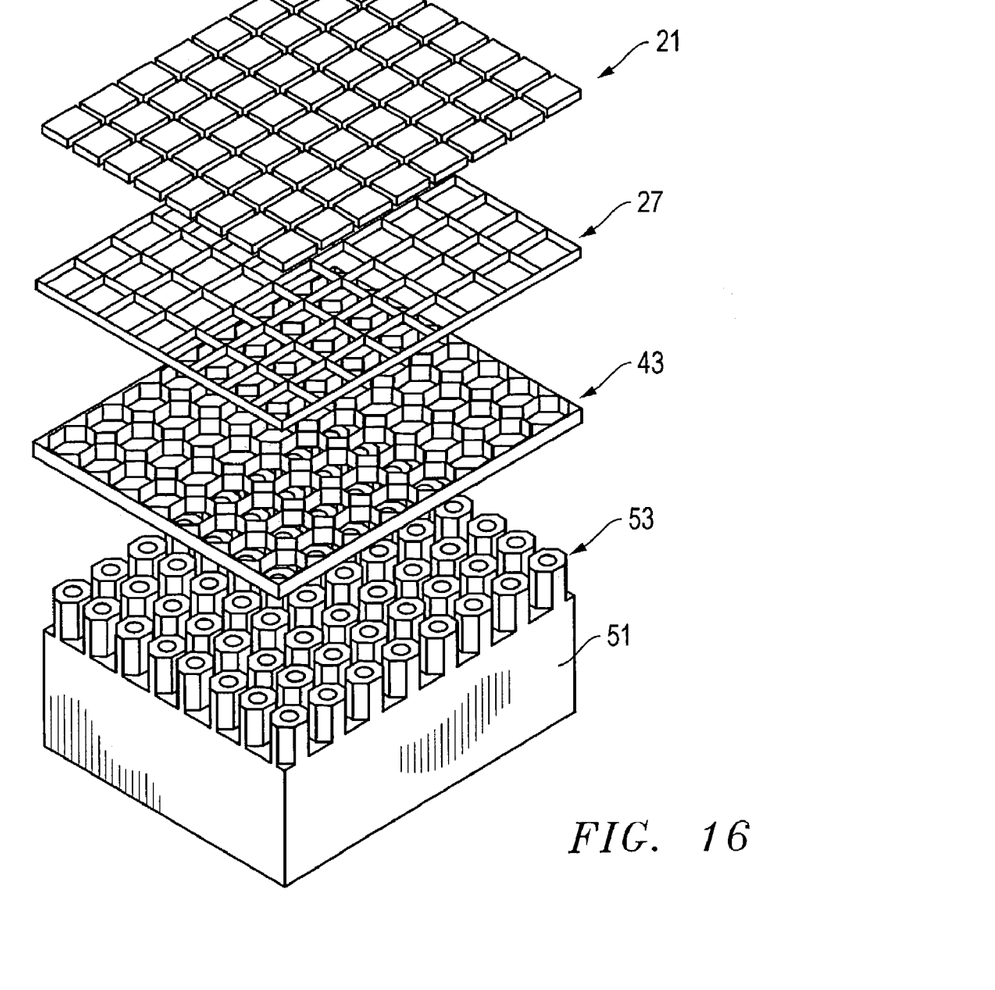
FIG. 16 is an exploded isometric view of an array of the sliders, the divider, the lid, and the vacuum fixture.

In the next step, the sliders 21 are engaged and retained with, in one embodiment, a vacuum, as illustrated at 79 in FIG. 17. The vacuum is provided by a vacuum fixture 51 (FIG. 11) that extends through one of the lids 43 (FIGS. 14–16). The vacuum fixture 51 has pedestals 53 that protrude through one of the lids 43 to contact the sliders 21 and hold them with the vacuum 55. The vacuum fixture 51 is used when either the top or bottom lid 43 of the shim stack 45 is removed. Thus, at least a portion of the shim stack 45 is disassembled to provide access to all sides (either the top or bottom) of the sliders 21 for additional cleaning and inspections, as depicted at 81 in FIG. 17.

The direct debond process of the present invention has many advantages. The divider acts as a stabilizer during the planerization process that reduces contraction of the planerization material during curing and thereby reduces movement of the sliders by the planerization material. The introduction of the metal webbing between the sliders acts as a stabilizer much like rebar in concrete. This additional support eliminates the position variations introduced by curing the planerization material. There is also a decreased yield loss associated with handling. Prior art processes used robotic pick and place tools to transfer the sliders from the process carrier to a cleaning and inspection tray. This transfer caused mechanical damage which translated to yield loss. The present invention also reduces capital investment by eliminating the need for the expensive pick and place robots that used to transfer sliders from the process carrier to the cleaning and inspection trays.

In addition, data integrity is maintained throughout the process as performance and defect data is collected and associated with each individual slider during processing. The collected data is associated with a position on the carrier. In the prior art, any time a slider was transferred from one carrier to another, the serial number had to be read to ensure that the data followed the slider to the new carrier. In contrast, the direct debond process of the present invention ensures that the sliders always stay with the divider, thus the transferring operations are eliminated and data integrity is maintained through out the process. The elimination of transferring operations also reduces the risk of mishaps such as mixing or spilling of parts.

The present invention also has superior cleaning and inspection capabilities. The cleaning trays used in the industry have traditionally been injection molded plastic trays in which the parts sit in pockets. The three-piece shim stack of the present invention was designed to maximize fluid flow around the sliders, which result in cleaner parts and higher yield. Furthermore, the shim stack allows access to all sides of the sliders since the top and bottom of the stack can be removed without disturbing the sliders. A vacuum fixture holds the parts extremely flat so that inspections stations do not have problems with focus issues. Consequently, inspection cycle times are shorter and fewer inspection stations are needed.

While the invention has been shown or described in only some of its forms, it should be apparent to those skilled in the art that it is not so limited, but is susceptible to various changes without departing from the scope of the invention.

What is claimed is:

1. A method of processing sliders during single slider processing, each of the sliders having an etch surface and corners, the method comprising:

placing a divider on a tape, the divider having a plurality of pockets;

placing sliders in at least some of the pockets in the divider so that the etch surfaces of the sliders face down onto the tape;

introducing a planerization material between the sliders and the divider;

curing the planerization material such that the divider, the sliders, and the planerization material form an assembly;

bonding the assembly to a carrier;

etching air bearing patterns into the etch surfaces of the sliders;

debonding the sliders to remove the assembly from the carrier, such that the sliders are still attached to the divider by the planerization material;

placing the assembly between two lids to form a shim stack, such that the lids only contact the corners of the sliders;

flowing fluid through the shim stack to clean away the planerization material;

engaging and retaining the sliders with a fixture; and disassembling at least a portion of the shim stack to provide access to the sliders for additional cleaning and inspection.

2. The method of claim 1, wherein the introducing step comprises fully encapsulating the sliders with the planerization material such that all surfaces of the sliders other than the etch surfaces are covered with the planerization material.

3. The method of claim 1, wherein the bonding step comprises bonding the assembly to the carrier with a thermal release adhesive.

4. The method of claim 1, wherein the debonding step comprises heating the assembly and the carrier to activate the thermal release adhesive.

5. The method of claim 1, wherein the flowing step comprises placing the shim stack in a hot solvent ultra-sonic bath to dissolve the planerization material and clean the sliders.

6. The method of claim 1, wherein the engaging step comprises engaging the sliders with a vacuum such that the sliders are visible to a user.

7. A method of processing sliders during single slider processing, each of the sliders having an etch surface and corners, the method comprising:
 placing a divider on a tape, the divider having a plurality of pockets;
 placing one slider in each of the pockets in the divider, such that the etch surface of each slider faces down onto and is retained by the tape;
 introducing a planerization material between the sliders and the divider such that the planerization material fully encapsulates all surfaces of the sliders other than the etch surfaces;
 curing the planerization material such that the divider, the sliders, and the planerization material form an assembly;
 flipping and bonding the assembly to a carrier using a thermal release adhesive;
 etching air bearing patterns into the etch surfaces of the sliders;
 debonding the sliders by heating the assembly and the carrier to activate the thermal release adhesive to remove the assembly from the carrier, such that the sliders are still attached to the divider by the planerization material which is not affected by the heat;
 placing the assembly between two lids to form a shim stack, such that the lids only contact the corners of the sliders;
 flowing fluid through the shim stack to clean away the planerization material by placing the shim stack in a hot solvent ultra-sonic bath to dissolve the planerization material and clean the sliders;
 engaging and retaining the sliders with a vacuum from a vacuum fixture that extends through one of the lids; and
 disassembling at least a portion of the shim stack to provide access to the sliders for additional cleaning and inspection.

8. The method of claim 7, wherein the vacuum fixture has pedestals and the engaging step comprises protruding pedestals through said one of the lids to contact the sliders and hold them with a vacuum.

* * * * *